Figure 1:
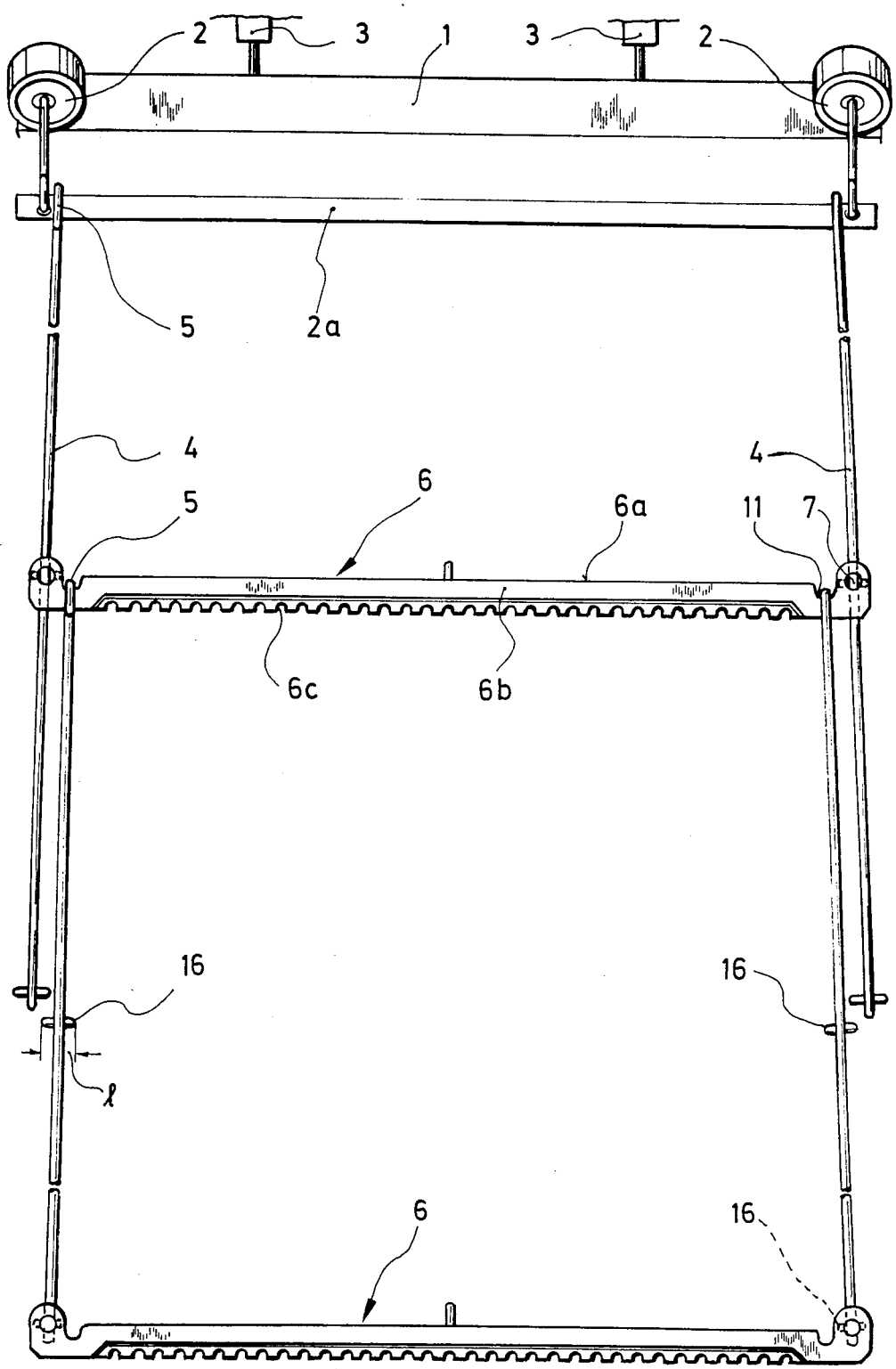

United States Patent [19]

Schönenberger

[11] Patent Number: 4,704,969
[45] Date of Patent: Nov. 10, 1987

[54] TRANSPORT MEANS WITH A FOLDABLE SUSPENSION CARRIER

[75] Inventor: Rolf Schönenberger, Landsberg, Fed. Rep. of Germany

[73] Assignee: Veit GmbH & Co., Fed. Rep. of Germany

[21] Appl. No.: 832,156

[22] Filed: Feb. 21, 1986

[30] Foreign Application Priority Data

Mar. 19, 1985 [DE] Fed. Rep. of Germany ....... 3509936

[51] Int. Cl.⁴ .......................... B60P 3/00; B61B 3/00
[52] U.S. Cl. .................................. 105/148; 211/118; 211/119
[58] Field of Search .................. 104/93; 105/150, 148; 211/113, 118, 119; 248/317; 403/79, 157

[56] References Cited

U.S. PATENT DOCUMENTS

| | | | |
|---|---|---|---|
| 988,468 | 4/1911 | Harth | 211/113 X |
| 1,738,030 | 12/1929 | Bebb | 211/118 X |
| 3,179,256 | 4/1965 | Underwood | 211/118 |
| 3,441,147 | 4/1969 | Kelley | 211/113 |
| 3,473,465 | 10/1969 | Tonjum | 211/113 X |
| 3,696,890 | 10/1972 | Armstrong | 104/93 X |
| 3,827,367 | 8/1974 | Pagla | 105/150 X |
| 4,162,730 | 7/1979 | Steere, Jr. et al. | 211/118 |
| 4,308,962 | 1/1982 | Fahmi | 211/118 |

FOREIGN PATENT DOCUMENTS 2167481 8/1973 France .
379076 8/1964 Switzerland ........................ 211/118

*Primary Examiner*—Randolph A. Reese
*Assistant Examiner*—Scott H. Werny
*Attorney, Agent, or Firm*—Darby & Darby

[57] ABSTRACT

The present invention refers to a transport apparatus in particular for internal, suspension transport systems of the type including a runner rail system and roller sets having rollers interconnected by a depending member. The apparatus has rail-shaped carrier members for supporting, in a suspended condition, transport material on a carrier member support surface. The carrier members are releasably suspendable at both ends from the roller sets, via suspension rods connected to the carrier members at transversely extending pivot axles, and the roller sets rest on the runner rail system. The pivot axles are perpendicularly displaced relative to the longitudinal axis of the carrier member to such an extent that the suspension rods can be folded into contact with a carrier member support surface by pivoting 90°. Clamping grooves are provided on the pivot axles to secure the folded suspension rods. The carrier members include troughs to receive hooks of additional carriers, and toothed racks.

10 Claims, 4 Drawing Figures

TRANSPORT MEANS WITH A FOLDABLE SUSPENSION CARRIER

FIELD OF THE INVENTION

The present invention relates to a transport means of the type utilized for suspension transport devices used for internal transport, for example, within factories.

BACKGROUND OF THE INVENTION

In a transport means known from practical use, the rail-shaped carrier member has a U-shaped profile. The continuous transverse web defines the carrier member support surface. The pivot axles are arranged within the U-shaped cross-section and the suspension rod whose end is provided with a bent loop is mounted on said pivot axles. A slot, which is provided in the carrier member support surface and which extends from the free end of said support surface, permits the suspension rod to be pivoted upwards at least until it extends at right angles to the carrier member support surface, i.e. until it reaches the position of support. If the carrier member is to be moved to a space-saving storage position, each suspension rod must be pivoted by approximately 270°, i.e. it must be swivelled onto the U-shaped profile. In view of the length of the suspension rods, the pivotal movement from the first to the second position requires a great deal of free space for movement and, in particular in the vicinity of delicate suspension transport material, a great deal of care for this movement which is, in principle, a simple movement. The open side of the U-shaped profile is not suitable for being used as a carrier member support surface for material to be suspended, especially for coat hangers or the like. There is the risk that coat hangers or the like, which have been hung up in a hurry, may have their ends placed, not over, but into the profile. The coat hangers may drop, which will cause trouble to textiles or the like placed on said coat hangers, or, if a large number of empty coat hangers was hung up in a hurry, they may get tangled up and delay the loading process. Hence, the long pivot path cannot be avoided by an inverted use of the carrier rod.

The present invention is based on the task of providing a transport means of the type described at the beginning, the carrier members of which can be handled in a faster, simpler and more versatile manner.

In accordance with the invention, this task is solved by the features of claim 1.

The essential advantage of the short pivotal movement resides in the fact that said pivotal movement is carried out above the carrier surface, i.e. not in an extension of said carrier surface, and can, consequently, also be carried out in surroundings where only a limited amount of space is available. Moreover, a suspended carrier member can easily be at both suspension rods simultaneously and, after lift off, said suspension rods can be folded in approximately at the same time without any change of grip being necessary. The same applies, vice versa, for the movement from the position of rest to the operating position. Furthermore, there is the possibility of detaching one suspension rod, folding it onto the carrier member support surface and conveying or "parking" the carrier member on the rail system in a space-saving manner such that it is approximately in alignment with the other suspension rod. In the case of conventional transport systems of the above-mentioned type, the necessary ground clearance for a 270° pivotal movement is not available.

A preferred embodiment primarily provides the possibility of positioning the suspension rods such that they are in close contact with the carrier member surface, without interference by the pivot bearings which are positioned above the cxarrier member surface. Moreover, the respectively folded in suspension rod is secured in a clamping groove against unintentional outward pivoting. The pivot axle is entrained in the case of each movement of the suspension rod and, consequently, also the clamping groove is moved to a specific position in each case. A releasable connection between the suspension rods and carrier members offers the advantage that it is possible to use suspension rods for different carrier members and carrier members with different suspension rods. The differences may include to dimensions, in the case of carrier members, also the profile and the structural design of the carrier member support surface, and in the case of suspension rods, also the shape of the suspension end facing away from the carrier member.

Other features are included in advantageous embodiments with regard to the connection between the suspension rod and the pivot axle. Due to the bayonet-catch-like locking between the pivot axle and the suspension rod, it is possible to hold the latter in various positions. Associated therewith is the possibility of reducing the transport height of the carrier member by locking the suspension rod in spaced relationship with their two ends. This has the effect that not the whole length of the suspension rod is used, and this, in turn, offers the possibility of placing—if the material to be suspended is of short length—carrier members according to the invention such that they extend one below the other and of thus increasing the transport capacity.

The pivot bearing arrangement according to the invention and the resultant possibility of pivoting the suspension rods into contact with the carrier member support surface offer the possibility of dispensing with an open carrier member profile. In a preferred embodiment, this advantage is utilized for providing a particularly orderly mode of supporting the material to be transported.

Figure 2:
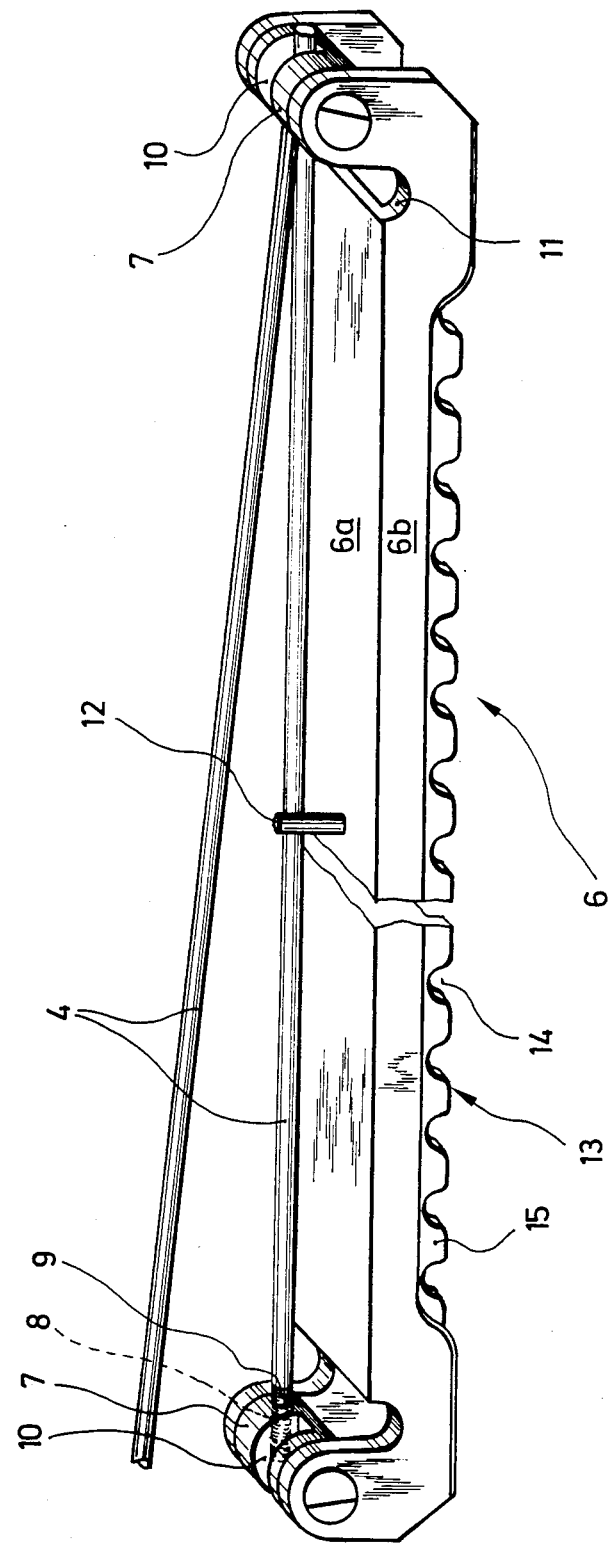
Figure 3:
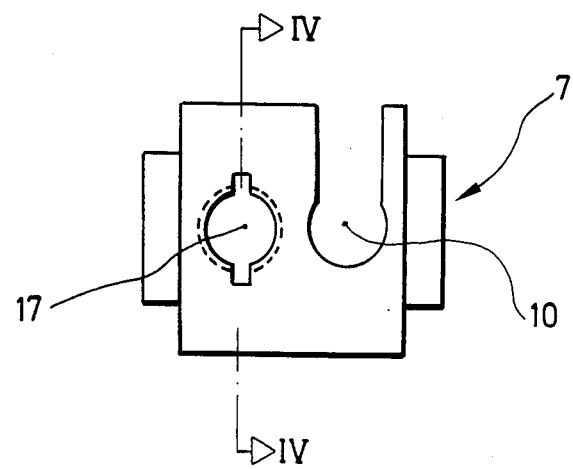
Figure 4:
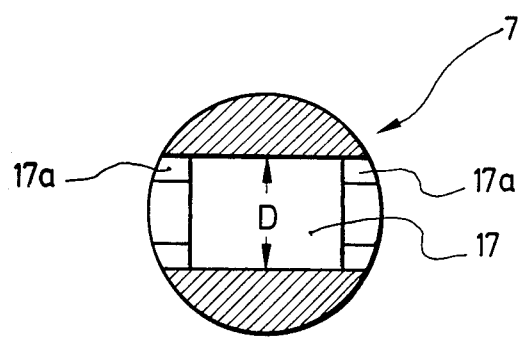

In the following, embodiments of the invention will be described on the basis of the drawings, in which FIG. 1 shows a schematic representation of a partial area of a transport means according to the invention, FIG. 2 shows an enlarged perspective view of a carrier member with suspension rods FIG. 3 shows a pivot axle, and FIG. 4 shows a section along the line IV—IV in FIG. 3.

FIG. 1 shows a portion of a runner rail 1 on which a long trolley 2a is supported by means of roller sets 2. The runner rail 1, which is part of a whole system, is secured to the ceiling of a room by means not fully shown which supports members 3.

An approximately railshaped carrier member 6 is suspended from the long trolley 2a by means of suspension rods 4. One end of each suspension rod forms an open hook 5 the shape and size of which is adapted to the cross-section of the long trolley. At the carrier member 6, each suspension rod is secured to a pivot axle 7. The upper side of each railshaped carrier member defines a carrier member support surface 6a—see also FIG. 2—for material to be transported, e.g. articles of clothing on coat hangers, which is not shown in the present figure.

As will be evident, in particular from the enlarged representation in FIG. 2, the pivot axles 7 are rotatably supported between extensions of the sidewalls 6b, said pivot axles 7 being supported such that they are displaced upwards relative to the carrier member support surface 6a. Each pivot axle 7 is adapted to have releasably and fixedly connected thereto a suspension rod 4 so that the pivot axle participates in the pivotal movement of the suspension rod. The embodiment according FIG. 1 shows a bayonet-type connection, which will be discussed in detail later on in connection with FIGS. 3 and 4. In the case of the embodiment according to FIG. 2, each pivot axle 7 is provided with a tapped hole 8, which is not constructed as a through-hole, and the suspension rod 4 has an external thread 9 at the end thereof. Adjacent the tapped hole 8 and parallel to the axis thereof a clamping groove 10 is provided on said pivot axle 7, the suspension rod 4 attached to the opposite pivot axle being adapted to be snapped in position in said clamping groove. Said suspension rod 4 will then be in close contact with the carrier member support surface 6a. Between the bearing area of the pivot axles 7 and the carrier member support surface 6a the lateral surfaces 6b form respective rounded troughs 11. As can be seen from FIG. 1, the hooks 5 of additional suspension rods 4 can be inserted in said troughs 11. It is thus also possible to transport two or several railshaped carrier members with one set of rollers. The carrier member support surface 6a has centrally secured thereto a pin 12 projecting upwards. Said pin limits the slide area for transport material hanging on the carrier member support surface. The underside 6c of the railshaped carrier member is provided with a longitudinally extending toothed rack 13 on which indentations 14 between the teeth 15 extend transversely to the longitudinal direction of the carrier member.

FIGS. 3 and 4 show a pivot axle for suspension rods according to FIG. 1. As outlined in FIG. 1, each suspension rod 4 has at the lower end thereof projections 16 protruding towards either side. The pivot axle 7 includes adjacent the clamping groove 10 a continuous snap-in hole 17. The inner diameter D of said hole 17 corresponds to the longest distance l between the two ends of the projections 16. The inlet and outlet portions 17a of said hole, however, define a contour corresponding essentially to the cross-section of a suspension rod plus projections (FIG. 3).

In the position of transport shown in FIG. 1, a carrier member 6 is suspended from the long trolley 2a by means of its suspension rods 4. Each suspension rod 4 of the upper carrier member is locked in position in its pivot bearing 7 by means of projections 16 provided approximately in the middle of the length of said suspension rod, i.e. in spaced relationship with the two ends thereof. The end portion of said suspension rod, which is provided with projections 16 as well, then protrudes freely downwards. The lower carrier member 6 has the hooks 5 of its holding rods 4 inserted into the troughs 11 adjacent the pivot bearings of the upper carrier member and the holding rods 4 of said lower carrier member 6 are secured to the associated pivot bearings 7 by means of their projections 16 provided at the end facing away from the hook. The projections 16 are, with regard to their extension relative to the longitudinal direction of the holding rod, adapted to the bend of the hook 5 in such a way that, when the projections are locked in position in the hole of the pivot bearing, the hook is located at the right position for being attached to the long trolley or to another carrier member.

Locking of a holding rod in the hole of a pivot bearing can also be achieved by other means. The holding rod and the hole can, for example, have oral contours so that an interference fit is achieved by means of a rotation. Another possibility is that notches provided at the holding rod profile cooperate with complementary locking points provided in the hole. In this case, an abitrary number of notches may be provided and at uniform or varying distances from one another.

In contrast to the position of transport of the carrier members, in the case of which the holding rods extend approximately at right angles to the main direction of extension of the carrier members, FIG. 2 approximately shows the position of rest or storage position of a carrier member. The holding rods, which are in this case secured to the respective pivot bearing by means of threads, are folded into contact with the carrier member support surface 6a. The suspension rod presenting itself to the viewer as the rear suspension rod occupies this position, whereas, for reasons of elucidation, the suspension rod located closer to the viewer still projects upwards in a slightly inclined position. In the folded position, each holding rod 4 snaps in position in the clamping groove 10 of the opposite pivot axle and is thus held on the carrier member. In this position, the carrier member requires little space for storing. The pivotal movement of each holding rod is thus performed inwards, i.e. directly towards the carrier member. Free outer space is required only in so far as the length of each holding rod projects beyond the length of the carrier member. The way in which each pivot axle is supported provides the possibility of suspending the carrier member also in an inverted position, i.e. with the toothed rack facing upwards. In this case, coat hangers or similar suspension members can be distributed into the respective indentations 14 and can thus be kept at a distance from one another in a position where they are less apt to slip. In the case of the locking possibility according to FIGS. 1, 3 and 4, the holding rod can possibly also be inserted from the other side of the pivot axle hole.

The present invention is not limited to the embodiments. The profile of each carrier member, for example, can be chosen arbitrarily to a very large extent, and can even be circular, provided that an abutment area for the folded-in suspension rods is available. In this connection, the expression "abutment" can easily also include a small distance between the carrier member surface and the suspension rod.

The clamping groove 10 can also be provided in the form of a clamping groove extending cicumferentially on the pivot bearing or it can be arranged in the form of two indentations. In this case, it will offer the possibility of receiving the second suspension rod also in cases in which the suspension rod secured to the pivot bearing does not occupy the folded-in position. This may be the case if a carrier member suspended from only one suspension rod is to be conveyed on the rail system or stored in a space-saving manner.

It is self-evident that the surface of the carrier member may, with an appropriately curved configuration, extend over the trough 11 as a cover means. Furthermore, the trough 11 can completely be dispensed with, if for the transport material, or for the suspension rods of an additional carrier member a different displacement limit is provided, or if a displacement up to the pivot bearings is acceptable.

I claim:

1. A transport means, for a suspension transport system for internal transport, said system being of the type including a runner rail system roller sets resting on said runner rail system, including depending means for interconnecting the rollers in a set, said transport means comprising rail-shaped carrier members each having a longitudinal axis extending from one end to the other end thereof, and a carrier member support surface for supporting goods to be transported in a suspended condition, suspension rods releasably suspending said carrier members from said roller sets, pivot axle means provided at said one end and said other end of said carrier members for pivotally connecting said suspension rods to a carrier member by said pivot axles extending transversely to said carrier member support surface and being perpendicularly displaced relative to said longitudinal axis of said carrier member to such an extent that said suspension rods can be folded into contact with said carrier member support surface by means of pivoting by 90°, and said pivot axles further comprising a clamping groove arranged adjacent to the location of connection of said suspension rods, said clamping groove of a pivot axle arranged at each end of a carrier member for clamping in said contact with said carrier member support surface a suspension rod connected to a pivot axle arranged at the opposite end of said carrier member.

2. A transport means according to claim 1, wherein said pivot axle is provided with a tapped hole extending parallel to said clamping groove and said suspension rod has an external thread adapted to engage said tapped hole for connecting said suspension rod to said pivot axle.

3. A transport means according to claim 1 wherein said pivot axle has a retention hole serving as said clamping groove and said suspension rod has at least one portion adapted to be locked in position in said retention hole, by means of a rotation by approximately 90°, for connecting said suspension rod to said pivot axle.

4. A transport means according to claim 3 wherein locking projections are provided on said at least one portion of said suspension rod at a point remote from said roller set, and said retention hole is a snap-in hole in which said locking projection can be fixed in the manner of a bayonet catch.

5. A transport means according to claim 3 wherein said retention hole extends through said pivot axle forming a first and a second opening and is provided at each opening with outlet portions for locking said locking projections when said suspension rod is inserted into said retention hole, either initially from said first opening, or initially from said second opening.

6. A transport means according to claim 4 wherein said suspension rod contains further locking means arranged between said roller sets and said locking means remote from said roller sets.

7. A transport means according to claim 1, comprising suspension rods having ends in the form of open hooks facing away from the carrier member, wherein each of said carrier members includes between its pivot axle and said carrier member support surface a transversely extending trough which is used for having an additional carrier member attached thereto by means of the hooks of its suspension rods.

8. A transport means according to claim 1, wherein each carrier member includes a first toothed rack which extends along at least a portion of said longitudinal axis and facing away from said carrier member support surface, and said first toothed rack having transversely extending indentations.

9. A transport means according to claim 8, wherein an additional toothed rack is arranged on said carrier member support surface of said carrier member, the width of said additional toothed rack being dimensioned so as to leave enough space at both sides for folding in said suspension rods, and the tooth spaced of said additional toothed rack is different from the tooth spacing of said first toothed rack.

10. A transport means according to claim 1, wherein said pivot axles are supported between suitable extended portions of sidewalls of the profile of said carrier member.

* * * * *